United States Patent
Andersen

(10) Patent No.: US 8,034,211 B2
(45) Date of Patent: Oct. 11, 2011

(54) THERMOPLASTIC ELEMENT FOR PROTECTION AGAINST CORROSION IN THE THERMOFUSION COUPLING OF A THERMOPLASTIC TUBE

(76) Inventor: Florencia Andersen, Buenos Aires (AR)

(\*) Notice: Subject to any disclaimer, the term of this patent is extended or adjusted under 35 U.S.C. 154(b) by 44 days.

(21) Appl. No.: 12/614,979

(22) Filed: Nov. 9, 2009

(65) Prior Publication Data

US 2010/0051197 A1   Mar. 4, 2010

Related U.S. Application Data

(63) Continuation of application No. 11/388,366, filed on Mar. 24, 2006, now abandoned.

(51) Int. Cl.
*F16L 11/04* (2006.01)

(52) U.S. Cl. ........ 156/293; 156/294; 156/322; 156/158; 156/309.9; 156/304.2; 156/304.6; 285/21.2; 285/54; 285/285.1; 285/286.1; 285/290.3; 285/288.3; 285/288.4; 285/290.4; 285/293.1; 138/138

(58) Field of Classification Search .................. 156/293, 156/294, 322, 158, 309.9, 304.2, 304.6; 285/21.2, 285/54, 285.1, 286.1, 286.2, 288.3, 288.4, 285/290.4, 290.3, 293.1; 138/138
See application file for complete search history.

(56) References Cited

U.S. PATENT DOCUMENTS 2,958,906 A * 11/1960 Youthed ........................ 156/294
6,293,311 B1 * 9/2001 Bushi et al. ................... 138/138
\* cited by examiner

*Primary Examiner* — Jeff Aftergut
*Assistant Examiner* — Jaeyun Lee
(74) *Attorney, Agent, or Firm* — Volpe and Koenig, P.C.

(57) ABSTRACT

It is the object of the present invention a thermoplastic element for the protection against corrosion in the thermofused splicing of a thermoplastic tube to a thermoplastic connection, which element has the shape of a fully thermoplastic tubular sleeve, able to be introduced into a socket mouth formed by the expansion of the tube end, said splice element bearing only one internal diameter and two external diameters which define a cylindrical external portion of larger diameter and a tubular projection which diameter is smaller than the former, and which is introduced into the thermoplastic tube, a lateral wall of the external portion defining a front butt of said thermoplastic element against the end of the thermoplastic tube. Said splicing element also exhibits an auxiliary ring which operates as a reference point for the assembly thereof.

16 Claims, 4 Drawing Sheets

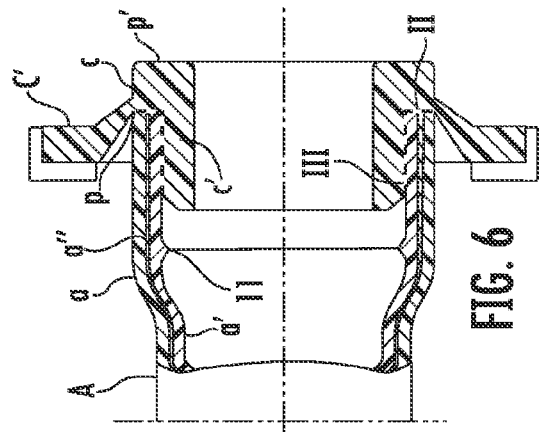
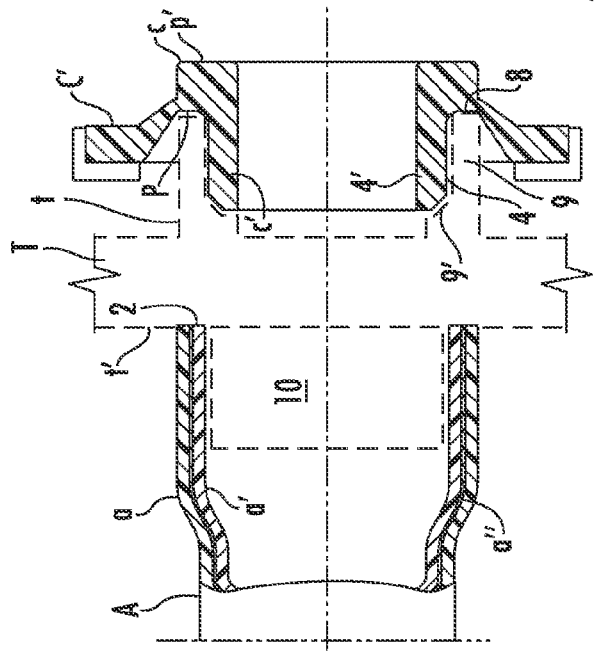
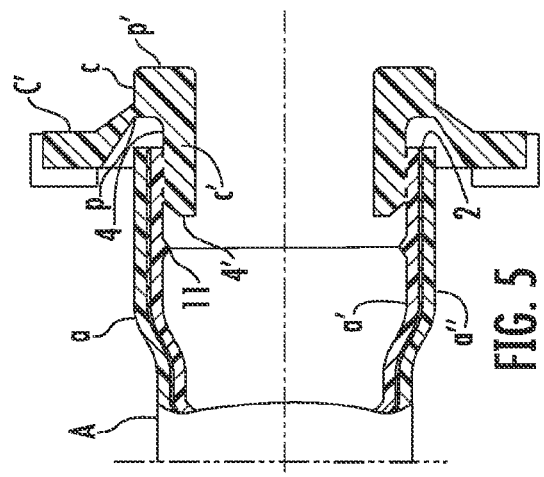

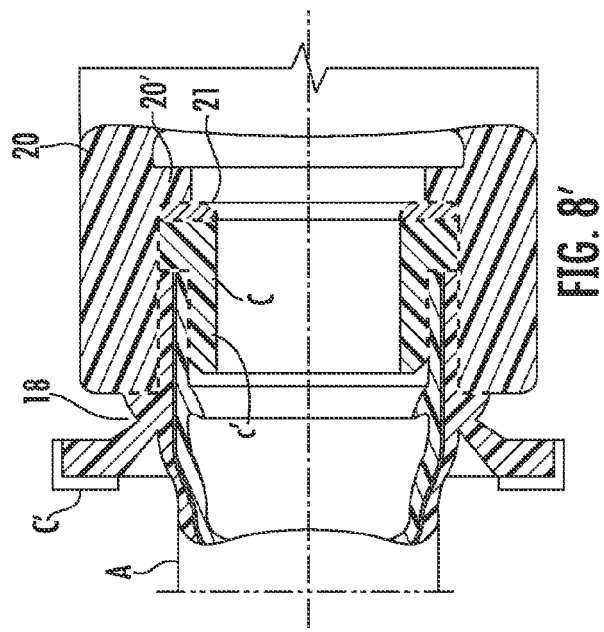
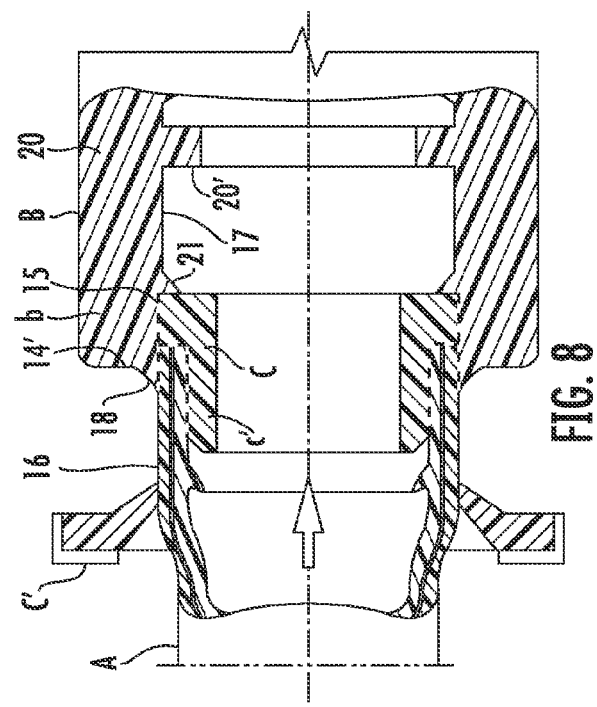
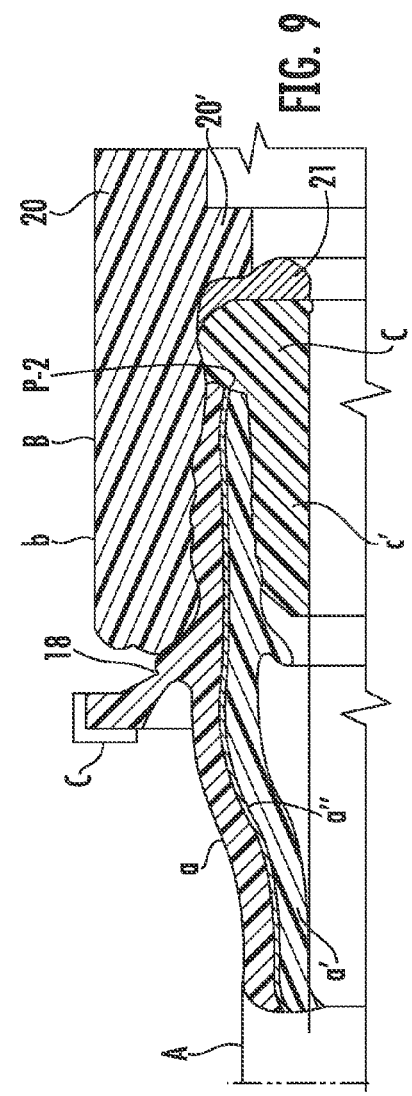

THERMOPLASTIC ELEMENT FOR PROTECTION AGAINST CORROSION IN THE THERMOFUSION COUPLING OF A THERMOPLASTIC TUBE

CROSS REFERENCE TO RELATED APPLICATION

This application is a continuation of U.S. patent application Ser. No. 11/388,366, filed Mar. 24, 2006, which is incorporated by reference as if fully set forth.

FIELD OF THE INVENTION

The present invention refers to a thermoplastic element for the protection against corrosion in the thermofused splicing of a thermoplastic tube to a thermoplastic connection.

More particularly, the present invention refers to a corrosion-inhibiting thermoplastic element at a thermofused splice of a thermoplastic tube consisting of an intermediate metal layer placed between two thermoplastic layers, with a thermoplastic connection.

BACKGROUND

At present, joints between thermoplastic tubes and connections are performed by means of thermofusion joining, whereby during a few seconds tube and connection are subject to a temperature in the range of from 260 to 270° C. and after the elapsing of the heating time both elements are joined by introducing the male end of one of them into the female opening of the other, with an adequate interference grade between their facing superficial layers, and they are fused, i.e. they are transformed into a single piece through them.

It is highly inadvisable to join tubes bearing a metal layer to the connections thereof by means of thermofusion, as such joining would only be accomplished between the external thermoplastic layer and the connection wall, the intermediate metal layer edge thus remaining internally uncovered, whereby water circulating through tubing would produce an oxidising process with the consequent deterioration of the metal layer, which would inevitably result in water leaks and/or contamination.

On the other hand, even where an abutting supplementary union could be done between the internal layer of the tube and an internal cylindrical surface of such connection, a highly resistant section would not be possible to obtain due to the reduced thickness of said internal layer, which section could not absorb the shearing force which causes bending of the connection wall upon the expansion due to the pressure of fluid working at high pressure, which on the other hand is easily absorbed by the tube without any alteration whatsoever due to the presence of the intermediate metal layer and which would obviously produce breakage of this joint and the resulting water-metal contact.

Consequently, connection between tube and any class of connection requires from the later to be provided with a tubular pin which is tightly inserted into said tube end, around which an external snap-fastener is applied in order to tighten same around the pin, thus creating an airtight joint between the internal thermoplastic layer of the tube and said pin. Due to said tubular pin thickness, a noticeable reduction of the tubing internal diameter is produced, giving rise to several drawbacks.

Further, this kind of connection is very expensive, not only due to the manufacturing cost of the piece itself but also due to the tools and labour required for the application thereof.

SUMMARY

It is thence the main object of the present invention the implementation of a termofused splice or joint, under maximum and total safety conditions, of a thermoplastic tube with a thermoplastic connection, by means of a thermoplastic element which may be incorporated to the tube end through thermofusion before the thermofusing operation of this end into the corresponding opening of said connection, providing such thermoplastic tube with a fully thermoplastic new with no metal layer, as through it the three layers end covering is obtained, inhibiting both internal and external contact of the metal layer edge with the connection and thus with water and further, a marked increase of the internal layer thickness is obtained, providing then a larger cross-section at the tube end, between its internal surface and said metal layer, which allows for the absorption of said bending stress which is normally produced at the joint area due to such connection expansion upon the high pressure operation of tubing.

Another object of the present invention is the provision of a clear visual or touch indication that the thermoplastic element has been included and that the connection to be made will be safe.

Another object of this invention is the application of said thermoplastic element by means of the same conventional tooling used in any thermofused joint of a thermoplastic tube and connection.

BRIEF DESCRIPTION OF THE DRAWINGS

In order to facilitate understanding of this invention and for a better appreciation thereof, the thermoplastic element and its incorporation to the thermoplastic tube has been illustrated as follows, according to one of its preferred embodiments, wherein:

FIG. 4 is a schematic view showing the splicing element and the tube end applied to the corresponding nozzles of a thermofusing machine, during prior heating stage of the surfaces through which fusing of both elements is to take place;

FIG. 5 shows a longitudinal section illustrative of fusion between the splicing element and the tube end, according to FIG. 3;

FIG. 6 is the same as FIG. 5, but showing splicing element after it has been applied and attached by means of thermofusion to the tube end, and ready to proceed with the final stage of thermofusion of this tube end to the thermoplastic connection;

FIG. 7' is the same view as in FIG. 7 once the introduction of tube with the splicing element into the second thermofusing machine is completed;

FIG. 8 shows the end of the tube with the splicing element and connection once heated, at the beginning of said thermofusion final stage;

FIG. 8' is the same view as FIG. 8 once the final thermofusion stage is completed;

FIG. 9 is an illustrative sketch from a practical example of how the thermofusion between tube end and abutting splicing element and connection has been accomplished.

DETAILED DESCRIPTION OF THE PREFERRED EMBODIMENTS

Figure 1:
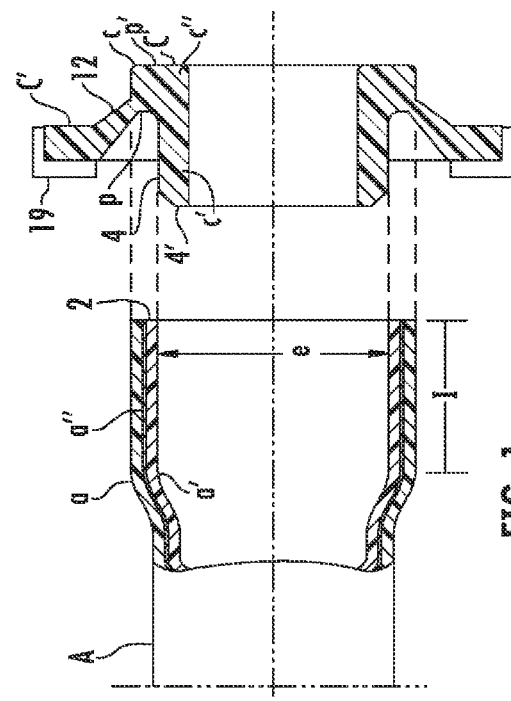
FIG. 1 shows a longitudinal cut view R-R of FIG. 2 and an exploded view of the splicing thermoplastic element and the end of tube, before attaching one to the other by means of thermofusion.

In FIG. 1 thermoplastic tube A exhibits a wall with two thermoplastic layers, an external a and an internal a', made of, for instance, polypropylene or polyethylene, with an intermediate metal layer a" made of, for example, aluminum foil adhered to both faces a and a', exhibiting, for example, a total wall thickness of 2 mm, i.e. 0.7 mm represented by external layer, 1.0 by internal layer and 0.2 by intermediate aluminum foil, both faces being provided with an adhesive cover 0.05 mm thick, all these dimensions being given by way of example.

Splicing element C has been developed as an injection pre-moulded fully thermoplastic tubular sleeve, for example, which diameter is larger that that of the tube itself, so that in order to be applied at the tube A end a socket mouth e, which is obtained by expanding end I of said tube A, should be previously formed.

It is the purpose to attain said expansion of tube end in a range of from 10% to 20% of the diameter of intermediate metal layer a" diameter, for all of the tubing diameters, and up to 15% in the particular case of an aluminum layer exhibiting the above mentioned dimensions.

This splicing element C which form is substantially that of a tubular sleeve exhibits only one internal diameter and two external diameters, which define a cylindrical external portion c which exhibits a rectangular longitudinal section which external diameter is the same as that of the expanded end I of thermoplastic tube A and which exhibits a side wall P abutting against tube end 2 and a height such that it covers the three layers of said tube, and a tubular projection c' which external diameter slightly larger than the internal diameter of expanded end I of tube and an internal diameter which is substantially equal to the internal diameter of tube A. Interference between said diameters is of from about 0.4 to 0.5 mm.

As regards length of c' dimensioning thereof has been considered according to a length smaller than that of expanded end I.

It is to be noted that above mentioned drawings illustrate said splice element C and a supplementary ring C', which will be described below, as integral part thereof, not participating in this application stage of splice element C of tube A end, it merely remaining incorporated to the latter in order to be used at the end of the process of thermofusion between said tube and the connection piece in the manner and to the end to be explained below.

Figure 3:
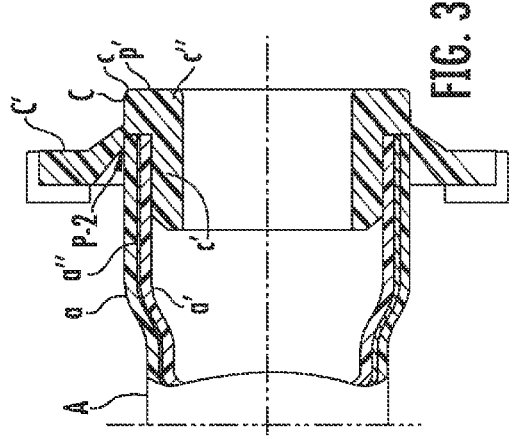
FIG. 3 is the same view as in FIG. 1, showing interconnection of splicing element and the end of the tube once fused.

External portion c of element C exhibits a rear lateral wall P' which will become tube A new end itself upon completion of the operation of element C fastening onto said socket mouth e as shown by FIGS. 3 and 6.

Such fastening will be accomplished by means of the direct and simultaneous thermofusion of abutting side wall P of element C to the joint end 2 of both thermoplastic layers a and a' and from said tubular projection c' to said internal thermoplastic layer a', according to the typical thermofusion technique, by heating on the one hand said abutting side wall P, external surface 4 of tubular projection c' and its external edge 4', and on the other hand said joint end 2 of tube and internal socket e internal layer, then introducing said tubular projection c' into socket e until said side wall P abuts against said joint end 2, all of the above under the required pressure and interference degree in order to obtain a firm interfusion between facing surfaces of both elements (FIGS. 4, 5 and 6).

The above described operation may be carried manually using female t and male t' nozzles provided on both sides of a first thermofusing machine T-I.

This operation of splice end C heating and subsequently, its application to the end of tube A could be carried out manually, maintaining splice element C applied on female nozzle t of the thermofusing machine in order to get a maximum contact between abutting lateral wall P of external portion c of element C, and the respective seat 8 of this nozzle t, and of external surface 4 of splicing element C against wall 9 of female nozzle t and its external edge 4' against the corresponding back step 9', in order to be sure that all of the element surface which is to actively act during the interfusion process with the joint end 2 and internal layer a' but maintaining the internal face of the projection and the splice element adequately "cold" in order to avoid collapsing of piece.

On the other hand, on male nozzle t', internal layer a' of the wall of expanded end I of tube A tightens laterally on a corresponding projection 10 thereof, and at the same time joint end 2 of tube A tightens at its base, obtaining the heating required for its interfusion with tubular projection c' and abutting lateral wall P of splice element C.

Subsequently, both are removed from the thermofusing machine, in order to be mutually faced and to gradually introduce element C into mouth socket e of tube end I, applying said element as if it were a stopper into a bottle, first forcing entering of tubular projection c' into tube A internal wall a' according to the established interference degree, wherein its external edge 4' proceeds at the superficial portion of the internal layer forming a lip 11 which aids in sealing the joint between both walls until abutting wall P of splice element reaches the bottom and fuses against the joint end 2 of the three layers of tube A (FIG. 6).

Thus a firm union by thermofusion is obtained between element C and tube A end which comprises an abutted joint II with both thermoplastic layers, and which continues with a pin joint III between internal layer of tube A and said tubular projection c' of element C, virtually wedged inside same, as illustrated by FIG. 6, such that behaviour of said element as an integral part of tube A is assured, with said metal layer fully enclosed by thermoplastic material.

At the same time, tube end is internally reinforced, offering a larger annular section between metal layer a" and tube internal surface at the union sector where bending stress is to be present upon tubing working at high pressure, due to the fact that the connection tends to expand, whereas the tube remains unaffected, because of the contention granted to its metal layer, as already mentioned.

As may be appreciated from what has been described and illustrated, incorporation of this splice element introduces no reduction of tube conduit, as the inner diameter of tubular projection c' is substantially equal to tube original internal diameter, and is fully within the expanded end I thereof (FIG. 6).

It is clear that by the incorporation of this element, tube A end is conformed as a single layer conventional tube, which external and internal surfaces end at a thermoplastic front which comprises all of the wall thickness and, accordingly, may be thermofused within a connecting piece as per the usual technique, heating said end and the interior of the corresponding nozzle of the connection and introducing one into the other with an interference extent between its lateral surfaces as required for the obtention of a sound welding between same, without any risk of its intermediate metal layer being exposed.

According to a preferred embodiment, inclusion within the scope of this invention has been contemplated of a control element which upon completion of the final stage of the thermofusion process between tube end, already bearing splice element C, and connection piece B, will provide a clear physical and external indication that said tube end incorporates said splice element and that this joint is safe, i.e. there is no risk for water to contact tube metal layer.

Accordingly, and as a supplementary element to the above arrangement, it has been contemplated the temporary inclusion at splice C of a supplemental ring C', initially formed as an integral part of said element C (FIGS. 1 and 2), shaped as an annular piece incorporated as a collar of larger diameter than said element C and which surrounds same concentrically, with an appreciable gap between them, they being joined only by a very thin intermediate wall 12 as a membrane arranged at the place where sweeping by the thermofusing machine nozzle is to take place. Said thin intermediate wall 12 thickness is such that such sweeping may only take place if the thermofusing machine provides an adequate thermofusing temperature. Thence, said auxiliary ring C' acts as a control of the minimum necessary temperature of the thermofusing machine nozzle.

This auxiliary ring C' has an internal diameter which is noticeably larger than the external diameter of the expanded wall of the tube, such as to fulfil a second auxiliary function, i.e. as a control of splice element C positioning, as we will see hereinbelow.

According to the above, element C is thermofused at the tube end as shown and illustrated by FIGS. 4, 5 and 6, bearing this auxiliary washer C', which has remained separated around same, wherein thermofusion between said splice element and tube is limited to joint end 2 of tube and stop P of this element C and though this auxiliary ring C' will receive some heat, indirectly radiated by splice element and its proximity to the thermofusing machine mouth socket, it is subject to no stress, as the fusion pressure is exerted only between one and the other, leaving aside this auxiliary ring, as shown by FIG. 4 schematics, wherein respective nozzles t and t' of the first thermofusing machine T-I employed during this preparatory stage for the heating of the parts which are to be joined: end I of tube A and element C.

Figure 7:
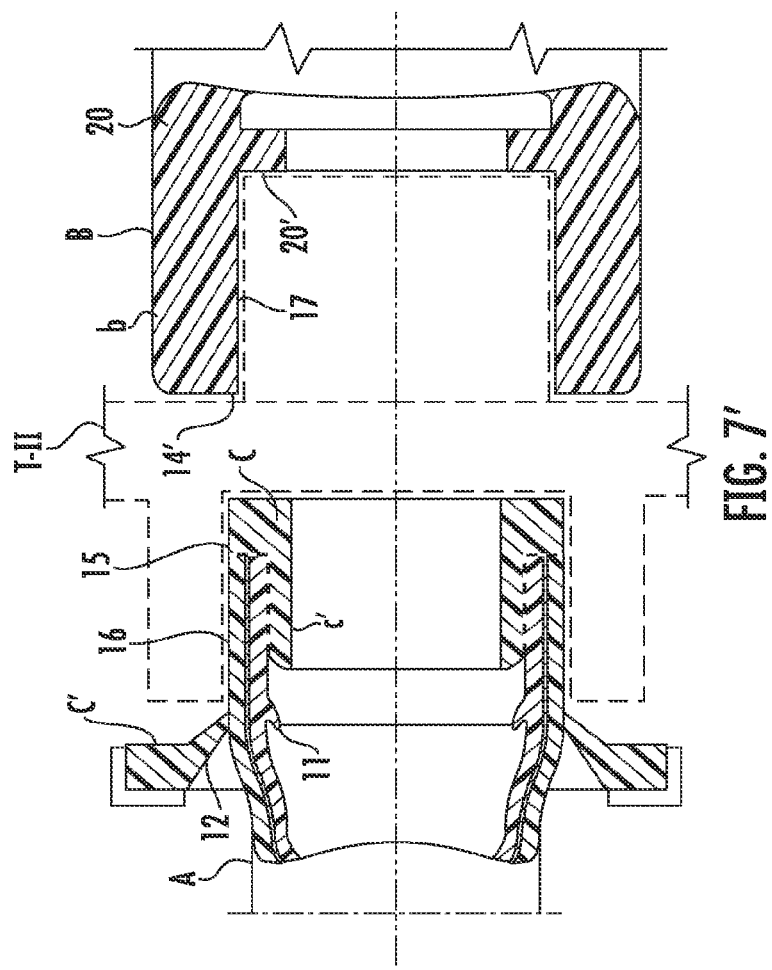
FIG. 7 shows behaviour of the element already applied to the tube end, when it is introduced in order to be heated into the corresponding nozzle of a second thermofusing machine, for the end stage of tube to connection thermofusion.
Figure 7:
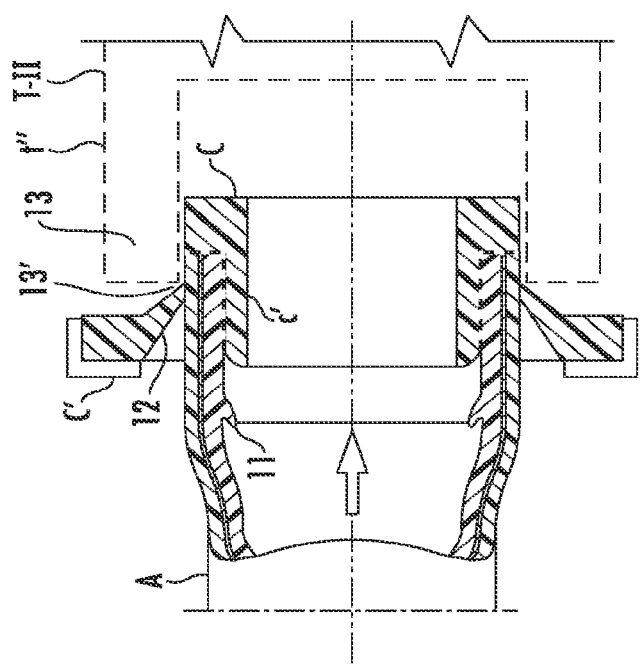

Thus, element C is applied to end of tube bearing said auxiliary ring C' around same, as illustrated by FIG. 6, such that when at the stage of heating tube end, upon the introduction thereof into nozzle t'' of the second thermofusing machine T-II (FIG. 7), at the final stage of the process, this auxiliary ring C' abuts against mouth 13' of end 13 thereof and intermediate wall 12 which joins same to splice C yields, provided temperature of nozzle t'' of thermofusing machine T-II is the adequate one, it ruptures and thus freely slides on the tube easily and, pushed by this end of said nozzle t'', is finally at the distance of tube A end corresponding to penetration length thereof in the latter (FIG. 7'), all in such a way that, upon retrieving tube from this nozzle t'' of thermofusing machine, this auxiliary ring C' is applied around its expanded end I as a "control", showing that same bears element C, which is schematically illustrated by FIG. 8 at the beginning of tube penetration into female portion b of connection B.

It is clear that this auxiliary ring C' is an accessory means that protects operator who may have omitted application of splice element according to the invention, without participating thence in the formation of the new thermoplastic end which seals the union between external and internal layers caps, over the edge of the aluminium cap.

When carrying out this final stage of thermofusion introducing end of tube A into female part b of connection B, auxiliary ring C' follows (FIG. 8) until it is virtually applied on socket 14' of female part b, gradually tightening around said tube wall due to the natural, albeit reduced, expansion produced under the compression stress between both elements which is required by its forced insertion and also to the natural outwards creepage of both facing superficial layers 15-16 on the side of element C and tube A and 17 by connection B and as a consequence thereof this auxiliary ring C' tightens over the material which tends to flow forming the classic external curl 18 which it contains, all of which may be appreciated on FIGS. 8 and 8''.

Figure 2:
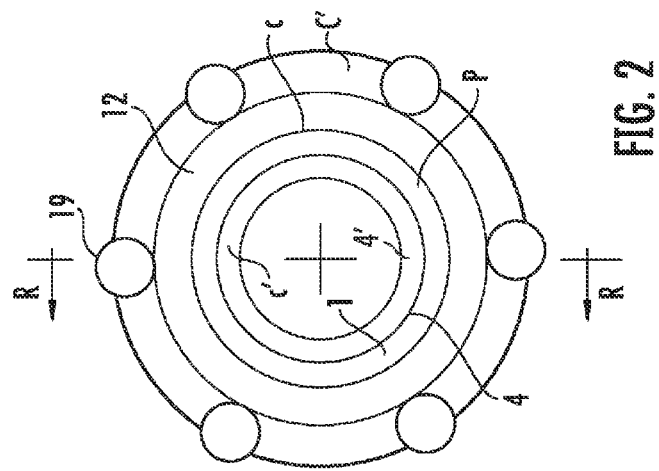
FIG. 2 is a side elevational view of the splicing element.

Lastly, reference must be made to the design adopted for this auxiliary ring C', depicted by FIGS. 1 and 2, with which it has been the intention to reduce thickness and amplitude of intermediate wall 12 which joins same to element C body, providing at the same time a configuration such that it contributes in maintaining it away from heat originated from the thermofusing machine at the end of the tube (FIG. 4), thus reducing any possibility of the degradation thereof.

On the other side, and in order to assure that this auxiliary ring C' is clearly and easily seen, around union, between tube A and connection B, once thermofusion is completed between both elements thus assuring that the coupling element has been applied at the end of the tube, not only has it been provided with an ample diameter, but it has further been equipped with several cylindrical projections 19 which protrude from the external periphery thereof underlining the presence of this washer, providing an easy tactile detection in those cases in which such detection is not visually possible. Also, it may be provided with colours contrasting that of the thermoplastic tube, so as to facilitate its visual detection.

Regarding the above mentioned final stage of the thermofusion process between connection B and new end of tube now formed by element C, it has been foreseen the establishment of an axial abutting joint, again by thermofusion, between element and internal step 20' of connection wall 20, incorporating between them melted material which flows into the interior of the connection as an effect of the interfusion of facing lateral surfaces of the tube wall with splice element included and the connection wall, as schematically depicted by FIG. 8' as an attempt to contain this creepage and thus increase contact pressure between said surfaces, reducing size of typical curl 21 formed inside the connection so it does not protrude within the tubing conduit.

In order to better understand how it is done in the practice, the referred thermofusion union between the wall of the tube end, including element and connection wall, it is included as FIG. 9 depicts a reproduction of a sketch from a digital image obtained from a partial longitudinal section of a sector of said union, where it can be seen the deformation and creepage of surfaces of either element which are mutually fused, establishing a perfect sealing between them, with the intermediate metal layer of the tube being isolated from any internal or external contact.

The invention claimed is:

1. A method of joining a thermoplastic tube and a corrosion-protecting element in a thermofused splice of the thermoplastic tube and a thermoplastic connection, comprising:
   providing the thermoplastic tube comprising an inner radial thermoplastic layer, an outer radial thermoplastic layer, and an intermediate radial metal layer disposed between the inner radial thermoplastic layer and the outer radial thermoplastic layer, an end of the thermoplastic tube being expanded to form a socket mouth;
   providing the corrosion-protecting element comprising a thermoplastic sleeve having an axially extending portion and a radially projecting portion joined with the axially extending portion by a radial step, the axially extending portion dimensioned to be housed within the socket mouth;

providing a female thermofusion nozzle and a male thermofusion nozzle;

heating the corrosion-protecting element by inserting the axially extending portion of the corrosion-protecting element into the female nozzle and activating the female nozzle;

heating the thermoplastic tube by inserting the male nozzle into the socket mouth of the thermoplastic tube and activating the male nozzle;

removing the axially extending portion from the female nozzle and removing the male nozzle from the socket mouth;

attaching the corrosion protecting element to thermoplastic tube by inserting the axially extending portion into the socket mouth; and joining a tubular thermoplastic connection element to the thermoplastic tube with the corrosion-protecting element interposed therebetween, wherein joining the tubular thermoplastic connection element to the thermoplastic tube comprises heating the corrosion-protecting element by inserting the radially projecting portion into a second female thermofusion nozzle, activating the second female nozzle, removing the radially projecting portion from the second female nozzle, and attaching the thermoplastic connection element by inserting the radially projecting portion into the tubular connection element and wherein the corrosion-protecting element further comprises an auxiliary ring that spatially extends around the axially extending portion of the protection element by way of a collar and is joined thereto by a thin intermediate wall.

2. The method of claim 1, wherein the male thermofusion nozzle and the female thermofusion nozzle are included in a single thermofusion machine.

3. The method of claim 1, wherein the thermoplastic tube has an inner diameter and the socket mouth has an inner diameter greater than the inner diameter of the thermoplastic tube.

4. The method of claim 3, wherein the corrosion protecting element has an inner diameter substantially equal to the inner diameter of the thermoplastic tube.

5. The method of claim 3, wherein the radially projecting portion of the corrosion-protecting element has an outer diameter and the axially extending portion has an outer diameter less than the outer diameter of the radially projecting portion and substantially equal to the inner diameter of the socket mouth.

6. The method of claim 1, wherein heating the corrosion protecting element comprises applying heat to at least the radial step with the female nozzle.

7. The method of claim 1, wherein heating the thermoplastic tube comprises applying heat to at least the inner radial thermoplastic layer and the outer radial thermoplastic layer at an axial end of the thermoplastic tube defining the socket mouth.

8. The method of claim 1, wherein:
heating the corrosion protecting element comprises applying heat to the radial step with the female nozzle;
heating the thermoplastic tube comprises applying heat to the inner radial thermoplastic layer and the outer radial thermoplastic layer at an axial end of the thermoplastic tube; and
attaching the corrosion protecting element to the thermoplastic tube comprises joining the radial step with the axial end of the thermoplastic tube.

9. The method of claim 1, wherein a height of the radial step is substantially equal to a thickness of the thermoplastic tube.

10. The method of claim 1, wherein the socket mouth is expanded by 10% to 20% of the diameter of the intermediate radial metal layer.

11. The method of claim 1, further comprising rupturing the thin intermediate wall and separating the auxiliary ring from the corrosion-protecting element when inserting the radially projecting portion into the second female thermofusion nozzle.

12. The method of claim 11, further comprising sliding the auxiliary ring axially along the thermoplastic tube in a direction away from the corrosion protecting element after separating the auxiliary ring from the corrosion-protecting element.

13. The method of claim 1, wherein the auxiliary ring comprises a plurality of projections extending on a periphery thereof.

14. The method of claim 1, wherein the thin intermediate wall is dimensioned to only permit detachment from the corrosion protecting element when a predetermined thermofusion temperature is reached.

15. The method of claim 1, wherein the auxiliary ring exhibits a color that contrasts with a color of the thermoplastic tube.

16. The method of claim 1, wherein the auxiliary ring extends from the corrosion-protecting element at a location proximate to the radial step.

* * * * *